Jan. 5, 1960 B. M. GORDON ET AL 2,920,312

MAGNETIC SYMBOL GENERATOR

Filed Aug. 13, 1953 4 Sheets-Sheet 1

*INVENTORS*
BERNARD M. GORDON
AN WANG
RENATO N. NICOLA

BY Joseph Weingarten
*ATTORNEY*

INVENTORS
BERNARD M. GORDON
AN WANG
RENATO N. NICOLA
BY Joseph Weingarten
ATTORNEY

MAGNETIC SYMBOL GENERATOR

Filed Aug. 13, 1953 4 Sheets-Sheet 3

INVENTORS
BENARD M. GORDON
AN WANG
RENATO N. NICOLA

BY Joseph Weingarten
ATTORNEY

Jan. 5, 1960 B. M. GORDON ET AL 2,920,312

MAGNETIC SYMBOL GENERATOR

Filed Aug. 13, 1953 4 Sheets-Sheet 4

INVENTORS
BERNARD M. GORDON
AN WANG
RENATO N. NICOLA

BY Joseph Weingarten
ATTORNEY 2,920,312
Patented Jan. 5, 1960

2,920,312

MAGNETIC SYMBOL GENERATOR

Bernard M. Gordon, Concord, An Wang, Cambridge, and Renato N. Nicola, Natick, Mass., assignors to Laboratory For Electronics, Inc., Boston, Mass., a corporation of Delaware Application August 13, 1953, Serial No. 373,966

34 Claims. (Cl. 340—174)

The present invention relates in general to the generation and visual display of electrical signals and more particularly concerns the utilization of novel magnetic techniques for reliably presenting alphabetic, numeric and other arbitrary symbols upon a cathode ray oscilloscope at exceedingly high speeds, if desired.

In numerous modern data interpreting and processing systems, there exists the need for rapid conversion of coded output data to immediate visual display or to some permanent form capable of being directly read. It is well known that the full potential effectiveness of many large scale digital computing machines remains unrealized, not because of limitations inherent in the internal calculation and control circuitry, but rather by virtue of the unavailability of high speed data conversion apparatus having reliability consistent with or exceeding that of the computer itself, in combination with extreme flexibility insofar as symbol choice is concerned. In representative present-day practice, it is not uncommon to utilize magnetic tape-recording equipment for intermediate storage of the high speed signal output of electronic computers. This medium has the obvious disadvantage of yielding an output which must be further processed before significant results are derived. Thus, granting that the tape mechanism is capable of recording information at a rate comparable to its generation within the computer, it becomes necessary to use additional terminal equipment, such as a tape controlled electric type-writer, to translate the taped information to printed form. In the solution of complex problems, it is often necessary to wait hours, if not days, before the output information becomes available for interpretation.

Considerable effort has been expended on the problem of translating analog or digital coded electrical data representative of numbers, letters, or arbitrary symbols into a visual display. Whatever system is selected to perform such a function, the primary factors which must be considered are speed combined with reliability, economy, flexibility and compatibility with the data generating system itself. High speed tends to rule out cumbersome electromechanical devices, and suggests the cathode ray tube with its substantially inertialess beam for ultimate indication. The cathode ray oscilloscope is an excellent medium for display not only because it meets all the specifications above noted, but also because techniques for continuous and rapid photographic recording of the tube screen have been successfully brought to a high degree of perfection in allied arts.

One of the most obvious procedures for display of symbols upon an oscilloscope involves the graphical determination of the horizontal and vertical sweep potential waveforms required for deflection of a beam to create each character chosen. Considering the ten arabic numerals alone, it is clear that the requisite waveform generators will involve considerable complex equipment requiring many critical adjustments. A more efficient approach to electrical symbol generation is to generate standardized portions of the characters desired rather than to individually generate potentials for the whole character. Through electronic switching techniques, these portions may be sequentially combined upon the tube face to present the selected symbol. Analysis will show that the arabic numerals consist of straight lines and ellipses or portions of ellipses; thus, the number 5 can be synthesized with two lines and a portion of an ellipse. Linear elements may be derived from rectified sine waves, while elliptical segments are obtainable from two phase-displaced sine waves. Without unnecessarily elaborating upon such waveform generation, it may be said that a considerable number of wive-shaping and timing circuits are essential to operation; but of even greater importance is the fact that, due to intrinsic instability, a relatively large number of manual and automatic adjustments and controls are necessary to insure satisfactory operation initially, and further, to permit continued successful opertion despite component aging. System complexity will be appreciated by pointing out that in an acceptable segmental waveform-type symbol generator, 100 tubes with 40 adjustments are necessary for the generation of 20 different symbols. Notwithstanding this large number of circuit components, the system is fundamentally inflexible in that each new character to be generated requires the addition of new circuits and controls.

As a modification of the wholly electronic waveform symbol generator, there has been developed a simplified version in which a multi-deck ganged rotary switch is substituted for electronic switching. One of the advantages of this development is that new characters may be selected and added by plug-in units which are then joined to the master-switch mechanism. With this arrangement, it has been found possible to present a character upon an oscilloscope screen in as little as 600 microseconds, but this has required rotary switch and contact operation at 600 r.p.m. A further disadvantage inherent to the design is that to write the same character twice, a complete revolution of the primary switch is needed to re-gain access to that character. Thus, access time becomes a major limitation upon writing speed, and since access is itself determined by mechanical switching, high speeds have been unattainable.

Another method used to generate characters for presentation upon an oscilloscope is that commercially known as the Charactron, which fundamentally is a conventional cathode ray tube modified to the extent that it contains a beam-forming metallic stencil, known as a shadow plate and an additional deflection plate array. The first array of deflection plates directs the beam upon application of appropriate selection potentials to the area of the shadow plate in which the desired character appears, while the remaining plates position the character upon the viewing screen. This arrangement has the advantage that the entire character is generated at once, but by virtue of the internally sealed character stencil, it is obviously inflexible with respect to change of character.

Television type techniques have been proposed as means for translating coded output information to a presentation of the corresponding character upon a cathode ray screen. For example, the Monoscope, which features a permanent storage mosaic within a cathode ray tube, may be arranged to provide the necessary video signals. But as hereinabove noted for the Charactron, the Monoscope inherently precludes immediate reorganization and substitution of characters under changing conditions of use. Perhaps the most flexible of the television type character generators is the flying spot scanner, where substitution may be made by alteration of a transparent photographic stencil between the scanning field and the photoelectric cell pick-up unit. However, the use of symbol generation devices such as the Monoscope, Charactron, and flying spot scanner all require continued critical adjustment to insure precise positioning of the scanning beam over the character under view. Slight variations or drift in the positioning potentials will markedly distort the output character or have the more serious effect of presenting the wrong character for a particular command signal. The chance of error becomes greater, of course, as the number of characters on the storage mosaic is increased.

Any symbol or character may be synthesized by a pattern of dots, and it has been suggested that electron tubes be used in a matrix as the basis for controlling the generation of a selected dot pattern. Obviously, however, as the demand for resolution is increased, the number of electron tubes needed becomes excessive with a concurrent reduction in both system dependability and economy.

The present invention contemplates and has as a primary object the generation of a symbol video signal by the high speed scanning of a novel magnetic core memory matrix. When this video is applied to a cathode ray tube for luminous intensity control together with sweep signals coordinated with the scanning process, symbols of any desired configuration may be presented and, as will become apparent from the full disclosure below, this arrangement offers flexibility, reliability and high definition heretofore unattainable with an absolute minimum of switching equipment and critical adjustment.

In one basic aspect of the present invention, a rectangular array of uniform static magnetic memory-type toroidal cores having the well-known rectangular hysteresis characteristic is utilized as the matrix for symbol storage. The desired definition determines the number of cores and each core represents a possible dot in the selected symbol. Novel means are provided for cyclically scanning each of the matrix cores in a predetermined sequence and at a rate established by the desired printing speed. The scanning operation is effective to pulse each core, in turn, through a complete magnetic cycle. That is, in succession, the residual flux in each core is first reversed and then returned to its initial static state. By threading a single wire through cores of the magnetic matrix in the shape of the symbol to be displayed, a symbol video in the form of time-spaced, sharply defined electrical pulses will be induced therein during each complete matrix scan. Connecting the symbol line to the intensity control of a cathode ray tube while applying horizontal and vertical sweeps in synchronous relation with the matrix scan cycle, renders the symbol visible upon the tube face.

Since but a single wire is needed for each symbol, any desired number of symbols may be simultaneously threaded into the cores of the magnetic core matrix. Intercoupling among symbol wires is negligible. During each scan, all symbol wires simultaneously carry their respective pulsed video signals. Deflection waveforms for all symbols are constant, the variable being the beam intensity control signal.

There is, of course, wide application for video signals so generated. As will become apparent, a symbol selection control circuit under the influence of external control signals may be arranged to sequentially couple various symbol lines to the cathode ray tube intensity control while externally applied positioning potentials are used to determine the area of the screen in which the selected symbols are to be displayed. An unusual application is the fact that since all pre-wired symbols are generated simultaneously, a single symbol generating matrix and drive circuit combination may be used as the central symbol signal source for simultaneously displaying the same or different symbols on several cathode ray tubes.

Other advantages and objects of the present invention will become apparent from the following specification when taken in connection with the accompanying drawing in which.

Figure 1:
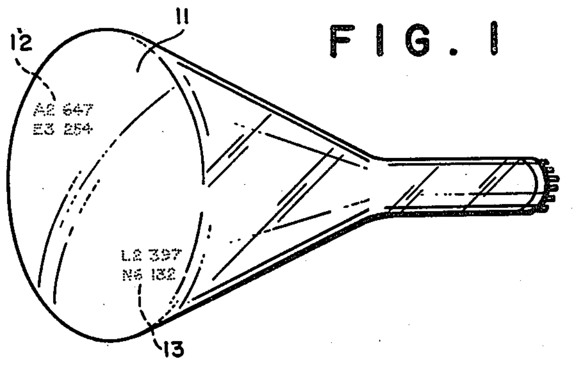
Fig. 1 is illustrative of a specialized cathode ray tube symbol display.

With reference now to the drawing, and more particularly to Fig. 1 thereof, there is illustrated for introductory purposes a symbol display upon a cathode ray tube 11. In the application shown, two sets 12 and 13 of ten symbols each are used for the visual identification of two areas of the fluorescent screen of the cathode ray tube 11. For reasons which are not material here, other than to indicate the flexibility of the apparatus herein disclosed, the symbol sets 12 and 13 have been arranged in two parallel rows of five characters, the first two characters in each row being distinctly separated from the remaining three. As will become evident later, there is substantially no restriction whatsoever on the nature of the symbol display, particularly insofar as symbol size, shape, position and relative spacing are concerned. Thus, the information displayed in the symbol sets may be drawn from the conventional numeric or alphabetic characters or may comprise any pictorial symbol or emblem desired within the scope of system resolution.

Close inspection of the symbol sets 12 and 13 reveals that each character is formed of a pattern of dots. In this respect, it will be shown that symbols are displayed by appropriately coordinating orthogonal (X and Y) sweeps with a dot modulation Z-axis intensity video signal and with suitable positioning potentials.

The electrical signals generated for the character display shown in Fig. 1 may be rendered visible upon electrostatic or magnetic deflection type cathode ray tubes by use of the required sweep voltages or currents. For either tube type, the dot modulation video signal is used to control cathode ray tube beam intensity.

The discussion which follows will set forth in considerable detail the novel manner in which the video Z-axis modulation signal is generated for all symbols. Also, the manner in which the necessary synchronous X and Y sweep potentials are generated will be indicated. However, it is deemed unnecessary for full understanding of this invention to disclose particular circuit design of the means for synchronously generating the signals necessary to space the symbol sets in the selected areas of the tube face as shown in Fig. 1, particularly since these positioning signals will always be a function of the specific application of symbol presentation to which the principles of this invention are applied.

Before examining the novel circuitry utilized to generate the video signals for display, it is well to analyze more thoroughly the appearance of one or more symbols. With specific reference now to Fig. 2, it may be seen that each symbol is created by a pre-selected array of closely spaced dots. In the discussion which follows, an arbitrary dot matrix in the form of a rectangle of eight consecutively numbered horizontal rows arranged in seven consecutively lettered substantially vertical columns will be utilized as the basis for explanation. A vertical column bearing the letter designation P is shown to the left of columns A—G for purposes to be discussed below. It will be understood, however, that the size of the matrix so employed is a function solely of the resolution desired and is in no way limited to a specific rectangular configuration or to the total of fifty-six dots.

Evidently, it is essential that the characters be formed upon the cathode ray tube in an easily discernible manner. If numerals or letters are used, it is desirable that these be clean-cut and of standard, readily recognizable shape. A 7 x 8 matrix with fifty-six dot positions has been observed to permit sharply defined presentation of symbols one-eighth inch high on a conventional cathode ray tube under average ambient lighting conditions. It has been observed that for this character size, the full resolution potential of a larger matrix is not definable with ordinary cathode ray beams, while characters formed with dot matrices as small as 3 x 5, though recognizable, require undesirable rectangular approximations of the usual curved portions of such characters as 2 and 5. It will be seen that symbol writing speed is a function of the matrix size for given broad band amplifiers.

Figure 2:
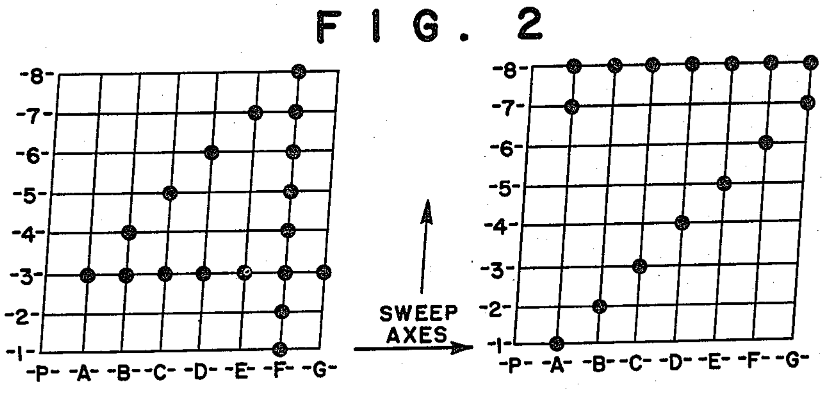
Fig. 2 is a graphical indication of the synthesis of several symbols from a dot matrix.

Fig. 2 illustrates specifically the manner in which the characters 7 and 4 may be synthesized from the fifty-six dot matrix. The resulting symbol clarity and distinctiveness is readily apparent. Elementary analysis will indicate that within the framework of this matrix, it is possible to draw a total of $2^{56}$ individually distinguishable symbols.

In accordance with the principles of the present invention, the arrays of dots representing symbols, such as those shown in Fig. 2, are translated to a corresponding pattern of luminous points upon the face of a cathode ray tube by the simultaneous application thereto of an appropriate combination of X, Y and Z-axis potentials. Assume that the numeral 4 shown in Fig. 2 is to be generated by an electron beam which is sequentially swept vertically from bottom to top for each of the seven vertical character columns while being simultaneously swept at a proportionately lower speed in the horizontal direction from left to right, as viewed from the face of the tube.

Fig. 3A graphically illustrates a saw-tooth potential which may be utilized as a horizontal sweep for a cathode ray beam which is simultaneously vertically swept with a higher frequency saw-tooth potential such as that shown in Fig. 3B. These two potentials, simultaneously applied, will provide the raster as a framework for the presentation of intensity signals. Although seven vertical rows are used in the basic dot matrix, it will be observed that eight vertical potential sweeps are provided for each full horizontal excursion. The first sweep, as will be analyzed more closely below, is used to insure a spacing at least equal to one vertical raster line, corresponding to column –P– in Fig. 2, between characters to avoid overlapping symbols or other ambiguity. That is, each symbol intrinsically carries with it suitable spacing areas. The slightly skewed vertical aspect obviously results from the fact that horizontal displacement from left to right occurs during the application of the individual vertical traces. If a system requisite were an exactly rectangular pattern, then an eight-step wave could be generated in lieu of the signal shown in Fig. 3A.

In Fig. 3C, there is illustrated on a time base corresponding to that of Figs. 3A and 3B, a Z-axis intensity modulation video signal which, when applied together with the sweeps of Figs. 3A and 3B, will generate character 4 as illustrated in Fig. 2. Each of the sharp potential spikes represents a luminous point on the cathode ray tube and close inspection reveals that these pulses occur in a time sequence dictated by the array of dots necessary for character 4.

Figure 4:
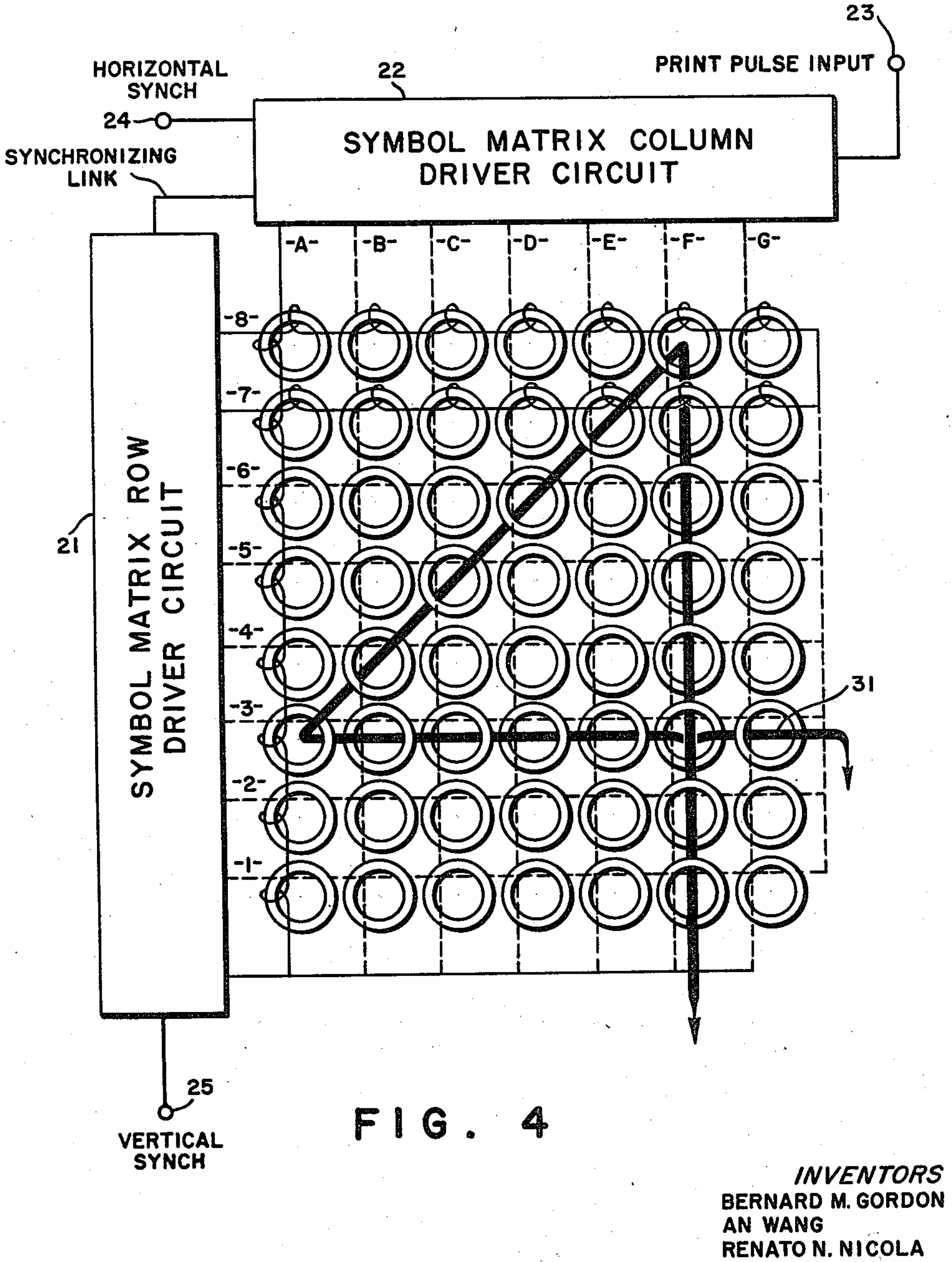
Fig. 4 is a diagrammatic representation of a magnetic core matrix in association with suitable driver circuits.

Having set forth the fundamental requiremens of X, Y and Z-axis potentials necessary for the presentation of dot modulation symbols, reference is now made to Fig. 4 for an introduction to and general consideration of the properties of a novel magnetic matrix capable of generating Z-axis intensity modulation signals while simultaneously providing signals capable of synchronizing the associated X and Y-axis sweeps. As illustrated, the basic magnetic matrix is formed of a 7 x 8 array of bistable magnetic memory components, each of which is preferably a relatively small toroidal core characterized by a substantially rectangular magnetic hysteresis loop offering two stable residual flux states. For correspondence in notation, the rows and columns have been respectively numbered and lettered as those in the symbols of Fig. 2. However, in this drawing, column –P– has been omitted.

Figure 5:
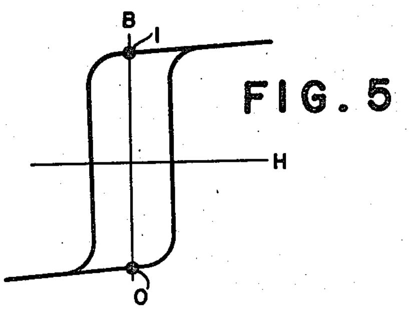
Fig. 5 is a graphical illustration of the magnetic characteristics of the matrix core components.

Fig. 5 is a graphical illustration of the magnetic characteristics of each of the toroidal elements. The two stable residual flux states are designated on the drawing as 0 and 1 in the manner used in binary notation in computer applications of these cores. In the discussion which follows, the 0 state will arbitrarily be taken as normal, and the 1 as the reversed static flux condition.

With reference again to Fig. 4, there are provided row and column synchronized driver circuits 21 and 22, respectively, illustrated in block form only, for interrogating the magnetic matrix in a predetermined pattern. Operation of the interrogation process is initiated by applying a print pulse to terminal 23. When in operation, these driver circuits yield output signals at the terminals 24 and 25 for the actuation and synchronization of horizontal and vertical sweeps, respectively.

Interrogation of a given magnetic core consists of pulsing it through one complete magnetic cycle. That is, the flux of each core is first reversed to the 1 state and then returned to its initial 0 condition. To obtain a symbol video signal for Z-axis intensity modulation, an output signal is derived from those cores in the matrix whose relationship to the scanning pattern corresponds to the shape of the symbol to be generated. For the generation of a video as illustrated in Fig. 3C, it is merely necessary to sequentially interrogate the magnetic cores shown in Fig. 4 beginning at the lower left-hand corner of the matrix at core –A–1– and progressing upwardly through the first column –A–2–, –A–3– . . . –A–8–, then returning and progressing upwardly through the second column, and so on, until core –G–8– in the upper right-hand corner of the matrix is reached. In this manner, in one complete scan of the matrix, each core, as it is pulsed, completely traverses its hysteresis loop, as illustrated in Fig. 5. It is only necessary to state at this point that coaction of driver circuits 21 and 22 effects this interrogation process. Circuit details are noted later.

With this scanning pattern, generation of the desired symbol video signal is accomplished by linking for output purposes cores disposed in the matrix in the shape of the symbol desired. With magnetic cores having the described characteristics, an electrical output is obtainable by providing an output winding on the core in which flux reversal will induce an electrical impulse. Since the total flux and the speed at which it is reversed in one of these magnetic cores is significantly large, a substantial electrical pulse output is obtainable by merely linking a single turn of an output winding with the flux change. That is to say that a symbol output line consisting simply of an insulated conductor threaded through those cores in the matrix oriented in the shape of the symbol to be generated will develop a potential pulse whenever the flux in each of the cores linked is reversed. Specifically, in Fig. 4, there is illustrated a symbol output line 31 threaded through those cores in the matrix which positionally correspond to the dots necessary to produce the symbol 4. Certain aspects of the wiring of symbol line 31 are to be noted. As it is preferable to have all output pulses on the line of like polarity, the symbol line is threaded through each selected core in the same sense. In Fig. 4, the symbol line enters each core from below and leaves from above, when traced in a particular direction. Also, at the cross-over point at core –F–3–, the symbol line 31 is not looped through twice, as the result might then undesirably be either a double amplitude pulse or no pulse when this point is scanned.

Assuming that the driver circuits sequentially and uniformly pulse all cores in the matrix in the manner above described, a train of pulses will be carried upon symbol output line 31 which correspond when viewed on a time base to those pulses illustrated in Fig. 3C. Now then, to generate any predetermined set of symbols, it is only necessary to thread through the cores as many symbol output lines respectively in as many symbol shapes as desired. Considering the usual internal diameter of toroidal bistable magnetic memory cores, it becomes evident that several hundred symbols, if desired, may be wired into the matrix without undue complexity. Resultantly, a single core array is sufficient to generate all desired symbols, and in view of the relative simplicity of symbol line set-up, symbols may be altered whenever necessary by personnel without specialized technical training in the precise design of the symbol generator.

Fig. 4 has been presented chiefly to facilitate explanation of the use of a single conductor or symbol line may be used to derive a symbol video. For this reason, circuit detail was avoided. A comprehensive discussion now follows.

Figure 6:
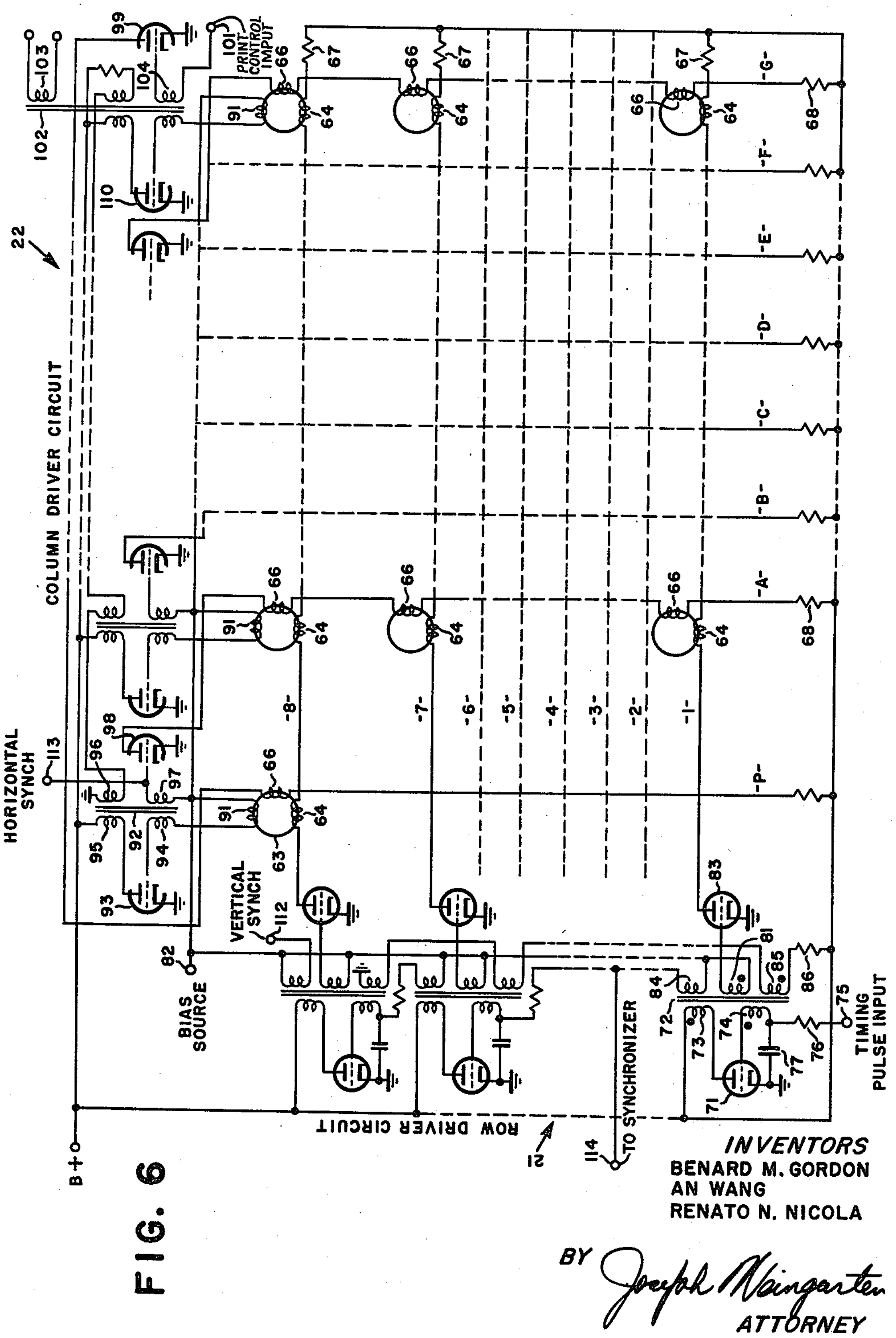
Fig. 6 is a schematic circuit diagram of a symbol generating magnetic core matrix and the associated driver circuits.

Fig. 6 is a schematic circuit diagram which serves to illustrate an arrangement whereby a magnetic core matrix whose logical functions have been briefly noted above, may be sequentially pulsed for the generation of symbol video signals on one or a plurality of output lines appropriately connecting selected cores for the symbols desired. The organization of Fig. 6 roughly approximates the layout shown in Fig. 4. The magnetic matrix is formed of a 7 x 8 array of bistable magnetic toroidal cores, as earlier described in connection with Fig. 4; but in addition, a fifty-seventh core 63 (–P–8–) is provided as a vestigial eighth column. Limitations of space have precluded illustration of all cores, but in view of the repetitive pattern, no confusion should exist as to the meaning of regions encompassed by the broken lines.

Each of the cores in the matrix, including core 63, carries a horizontal or row winding 64 and a vertical or column winding 66. Windings 64 in each row are connected in series to a positive potential source B+ through a current limiting resistor 67, and windings 66 in each column are similarly connected in series to B+ through limiting resistors 68. The opposite ends of each row and column series circuit are respectively actuated from row and column drive circuits 21 and 22, as will be further described.

Row driver 21 is comprised essentially of a cascade of blocking oscillators and power tubes using toroidal bistable cores of the type already discussed in reference to the symbol matrix. Consider the input stage consisting of a triode 71 and magnetic element 72 (preferably a toroidal core in physical form) having five windings whose relative polarities are denoted by the conventional "dot" symbolism. As illustrated, winding 73 couples the plate of tube 71 to the positive power source B+, while winding 74 connects its grid to a timing pulse input terminal 75 through an RC timing network 76—77. A cut-off bias potential from a source (not shown) is maintained at terminal 75. Winding 81 couples a second cut-off bias source potential, applied at terminal 82, to the control grid of tube 83 which provides the needed power output for that stage of the driver circuit. As is apparent, the output of tube 83 drives the respective series of row windings 64. Winding 84 serves to transfer flux change information in core 72 to the next succeeding stage through the next succeeding RC timing circuit. Thus, one end of winding 84 goes to the next stage and the other to bias terminal 82 for normal cut-off of this next stage. The final winding 85 on core 72 connected in series with the respective windings on succeeding cores and in series with a limiting resistor 86 between B+ and ground. The constant current thus established in winding 85 normally maintains the core in the 0 state, and in the event that a magnetic force is applied to set the core to the 1 state, upon removal thereof, the current in winding 85 will return the core to its initial 0 state. For each succeeding row in the eight row matrix shown, there is provided a blocking oscillator tube such as 71, and a power driver such as 83 for the row windings. The uniformity and repetitive nature of the circuits is apparent from the drawing. Assume now that a positive pulse from a timing source (not shown) is applied at terminal 75 with sufficient magnitude to overcome the normal negative bias thereat to drive tube 71 into conduction. Current flow through winding 73 will reverse the flux in core 72 to the 1 state and in so doing, will induce in winding 81 and apply to tube 83 a positive potential sufficient to overcome its cut-off bias. This reversal will also apply a positive potential trigger to the grid of the next succeeding blocking oscillator tube. However, by virtue of the timing network in the next stage, corresponding to 76—77 in the first stage, a slight time delay will be achieved in the effectiveness of the trigger upon the next succeeding stage. Thus, the application of a single positive timing pulse to terminal 75 will trigger the first stage, which, through a preselected time delay, will in sequence trigger the second, and, through an equal delay, the third, and so on, until the eighth and uppermost stage of row driver 21 is triggered.

From the schematic circuit diagram, it is apparent that positively pulsing the grid of tube 83 will briefly result in conduction in the respective entire series row of windings 64, and as the pulse propagates in time through driver 21, each succeeding series array of row windings will be pulsed. The direction of this current flow in windings 64 throughout the core matrix is such as to set each of the matrix cores to the 0 state.

As will be further discussed, the speed at which a pulse applied to terminal 75 is propagated through the row driver 21 is a function of the interstage time constants of RC network 76—77. The speed selected will, of course, be dependent upon the scanning rate desired, but has as an upper limitation the inherent maximum speed at which a core may experience a flux reversal. To a limited extent, the blocking oscillator chain in row driver 21 may be viewed as a delay line whose total pulse delay time is equal to the sum of the delays between stages. Equal interstage delays are obviously preferable for uniformity of symbol presentation.

Assume now that a periodic timing signal is applied at terminal 75. If the period is just greater than the total propagation delay of driver circuit 21, then the horizontal series circuits of row windings 64 will be consecutively pulsed from row —1— to row —8—, and when the uppermost and last is reached, the system will recycle on the receipt of the next timing input pulse. In other words, the row-to-row scan of the matrix is continuous at a frequency determined by the input pulse rate; however, in the absence of other phenomena, the continuous horizontal scan will be without effect due to the fact that each power driver tube such as 83 may only pulse a matrix core to set the normal 0 state. A core having the characteristic shown in Fig. 5, when in the 0 state, and when pulsed again in the same direction will experience negligible flux change.

Prior to extending the discussion of matrix operation, the vertical or column driver circuit 22 will be set forth in greater detail. First it will be observed that although each stage of the vertical driver 22 resembles a stage of the row driver 21, there are no timing control circuits between vertical driver stages. The similarity exists in that each vertical driver stage includes a magnetic core, such as 92 in column —P—, wired in relation to a triode 93 as a blocking oscillator operative as disclosed for the row driver 21.

Significantly, each matrix core in uppermost row —8— carries a third winding 91 in addition to the row and column windings 64 and 66, respectively. The input to the control grid of triode 93 may be traced from the bias source at terminal 82 through winding 91 and through regenerative grid winding 94. The tube output pulses core 92 through winding 95 between B+ and the tube plate. Winding 96 is connected in series with corresponding windings in succeeding stages of driver circuit 22 between ground and the positive power source B+, and functions to normally maintain each core, such as 92, in the 0 state. Winding 97 couples flux change information in core 92 to the control grid of a power driver triode 98 and is connected at its opposite end to the bias source at terminal 82 for normally cutting off plate current in triode 98.

In much the same manner already described in connection with the row driver power output triodes 83, the plate of each tube 98 is connected to B+ through the associated column windings 66. In column —P—, there is but a single column winding 66 connected to B+ through a limiting resistor and to the plate of power driver tube 99 at the right-hand end of the column driver circuit 22. With respect to tube 99, an input signal is applied to the grid thereof from terminal 101 at which a normal cut-off bias, from a source not shown, is also applied. Core 102 differs from core 92 to the extent that a fifth winding 103 is disposed thereon for purposes to be discussed hereinbelow.

It was earlier noted that each tube, such as 83 in the horizontal driver circuit 21, normally pulsed each of the cores into its 0 state. It was also noted that the re-set current flowing through the series of coils, such as 96, in the column driver circuit 22 tended to set cores such as 92 and 102 into the 0 state. With these considerations in view, it is now appropriate to discuss the operation of the symbol matrix under the influence of an input print pulse applied to terminal 101. Assume that a positive pulse is applied to terminal 101 of sufficient magnitude to overcome the normal cut-off bias and to initiate conduction in tube 99 (the magnitude of this pulse as applied to the grid will not affect core 102 directly because winding 104 does not contain a sufficient number of turns therefor). Current flow in tube 99 will pulse the fifty-seventh core 63 and set it into the 1 state. Since this is a stable condition, nothing else will happen until a timing pulse applied at terminal 75 propagates through row driver circuit 21 to pulse the power driver tube in the uppermost stage thereof, thus placing all cores in row —8— to the 0 state. As noted earlier, in all cores in this row, with the exception of core 63, there will be no effect. However, since core 63 had been earlier set into its 1 state, it will now be re-set to its 0 state and will generate in winding 91, associated therewith, a positive pulse which, when applied to the control grid of tube 93, will overcome the normal cut-off bias to cause conduction therein. Conduction in tube 93 will substantially instantaneously reverse the flux in core 92 and yield a positive pulse in winding 97 which will overcome the normal cut-off bias and cause conduction in tube 98. This, in turn, will set all cores in column —A— to their 1 state through the column windings 66 associated therewith. Before proceeding further, it should be noted that while conduction in tube 93 set core 92 to the 1 state, cessation of conduction permits the steady current in winding 96 to re-set core 92 to the 0 state. By virtue of the polarities involved, this re-set operation will in no way affect the establishment of the 1 state in all cores in column —A—.

It will be observed that the setting of column —A— cores coincided in time with the arrival of a pulse in the uppermost stage of the row driver 21. Based on what was earlier stated, this is followed by the application to terminal 75 of a succeeding timing input pulse. In other words, the setting of column —A— cores to the 1 state is immediately followed by the progression through the row driver of a pulse which, in succession, re-sets each horizontal row of cores, beginning at row —1— to the 0 state. In this manner, each core from —A–1— to —A–8— will, in sequence, be re-set to the 0 state, each thus completing an excursion through its hysteresis loop. Now then, the arrival of a re-set row pulse at core —A–8— will, in reversing its flux to the 0 state, generate in the associated coil 91 a positive pulse which, in the manner precisely described earlier for tubes 93 and 98, set the 1 state in all cores in column —B—. Once again, this will be followed by a succession of re-set signals from the row driver, and the re-set of core —B–8— will result in setting all column —C— cores to the 1 state. Obviously, this phenomenon will progress from column to column until each core in column —G— is set to the 1 state and re-set to the 0 state.

The re-set of the fifty-sixth and final core —G–8— merits special consideration. As this core is re-set to the 0 state, a positive pulse is obtained in its winding 91 which is applied to the associated blocking oscillator tube 110. This will apply a positive pulse through winding 104 to tube 99, and in the event that the bias applied to terminal 101 is insufficient to keep tube 99 cut-off, this tube will once again conduct and set core 63 to the 1 state, and automatically recycle the scanning operation. Since in numerous applications of this symbol generating system, recycling is preferably externally triggered, a sufficiently large cut-off bias may be applied to terminal 101 to preclude automatic and continuous scan. On the other hand, this compels the application of an input pulse at terminal 101 which is large enough to overcome a bias of this magnitude to permit start of the scanning operation.

Winding 103 on core 102 yields an output signal substantially coincident in time with the re-setting of core —G–8—. In other words, this winding yields information that a matrix scan cycle has been completed and will be used for control purposes in a manner to be described in a discussion of system applications later.

Other pertinent data in the form of electrical pulses are derived for system use from the matrix and driver circuits shown in Fig. 6. Since the arrival of a pulse propagated through row driver 21 at the last or uppermost stage coincides with the termination of the scan of each column, a pulse taken at terminal 112 may be used to synchronize a vertical sweep generator generating the waveform earlier disclosed in Fig. 3B. At terminal 113, a signal may be taken for the synchronization of a horizontal deflection potential. At terminal 114 in the row driver circuit 21, a signal may be derived for appropriately synchronizing and timing the application of signals to terminal 101 in a manner which will be discussed below.

Whenever a magnetic core of the type described is changed from the 0 state to the 1 state, or re-set from the 1 state to the 0 state, the sharp flux reversal will induce electrical signals in the associated windings. Consider, for example, a single symbol line such as 31 in Fig. 4. Whenever an entire column of cores is set from the 0 state to the 1 state, a pulse will be induced in the symbol line if it threads through a core in the particular column so set. However, this pulse is opposite to desired polarity, and suitable means, such as a properly poled crystal diode, may be associated with the symbol line to short-circuit unwanted signals. Those signals which are generated as the core is re-set to its 0 state are of the desired polarity for system use.

It will be observed that for each complete scan of the matrix, pulsed video signals are generated on all symbol lines then in the matrix. The printing of a desired symbol, as by presentation on an oscilloscope screen, is controlled by connecting only its symbol line through an appropriate control circuit to the cathode ray tube intensity control grid for a period corresponding to a complete scan of the matrix immediately subsequent to the receipt of an input print pulse.

Utilization and control of the video signals during an active scan of a magnetic matrix will, of course, be a function of the design demands of the apparatus with which the symbol generator is associated. For example, assume that the symbol generator is to be used for the visual presentation of computer output data. For such purpose, it might be desirable to have each output signal of the computer select the symbol represented thereby together with a symbol position upon a cathode ray tube. Thus, uniformly separated rows and columns of digits forming the problem solution might be the desired format for the cathode ray tube display. If, as another example, the symbol generator is to be used to mark pre-defined areas of the tube screen, as shown in Fig. 1, then a different symbol format will be chosen. Having once established the format requirements, however, the necessary control and positioning potentials may be determined and generated.

Figure 7:
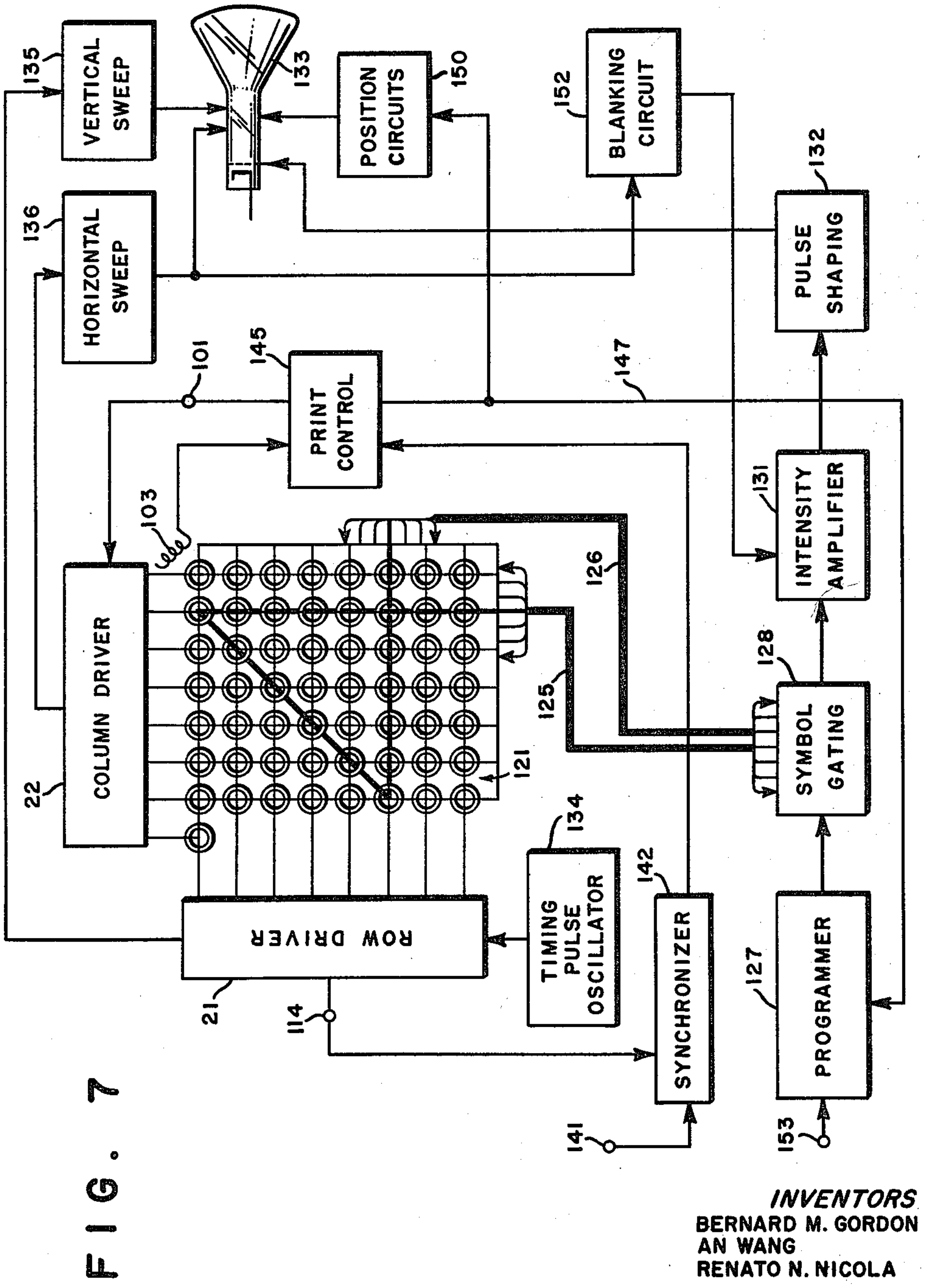
Fig. 7 is a block diagram showing the logical interconnection of circuits utilizing the magnetic core symbol matrix shown in Fig. 6 for the display of predetermined information.

In Fig. 7, there is illustrated in block diagram form, the logical interconnection of circuit components forming a system needed for the display of a symbol pattern. Full circuit details have been avoided primarily because their precise nature is not critical to thorough understanding of systems utilizing the magnetic symbol matrix hereinabove set forth. Review of a circuit arrangement utilizing the matrix, however, is advantageous for suggesting a circuit design philosophy, which may be modified as required to meet alternative design specifications.

With specific reference to Fig. 7, it may be seen that the key system component is the symbol matrix 121 and its horizontal and vertical driver circuits 21 and 22, respectively. The latter circuits function exactly as those already described in connection with Figs. 4 and 6 and are designated with like reference numerals.

All symbols desired for the particular application are wired through the seven columns and eight rows of cores in the basic matrix. In Fig. 7, only the symbol 4 is shown as actually wired; however, cables 125 and 126 coupled into symbol gating circuit 128 represent the remainder of those symbols wired through the matrix. Functionally, symbol gating circuit 128 selects, in response to information derived from programmer 127, the individual symbol line to be connected through to intensity amplifier 131. That is, during the interval that matrix 101 is scanned, one symbol line is connected through gating circuit 128 to amplifier 131. During such intervals as the symbol line for numeral 4 is connected to intensity amplifier 131, the signal input to the latter will appear as in Fig. 3C. Shaping circuit 132 is used for the removal of noise and spurious signals, and to provide clean rectangular pulses of extremely short duration to the luminous intensity control electrodes of cathode ray tube 133.

As previously discussed in connection with Fig. 6, a timing pulse oscillator 134 periodically pulses row driver circuit 21, thereby propagating a pulse therethrough for the continuous and sequential pulsing of the horizontal rows of cores. Operation of column driver circuit 22 is not initiated until an input signal reverses the flux in fifty-seventh core (—P–8—) of the matrix.

An output signal is taken from the row driver 21 (terminal 112, Fig. 6) for synchronizing the vertical sweep generator 135 and a pulse is taken from column driver circuit 22 (terminal 113, Fig. 6) for correspondingly synchronizing horizontal sweep generator 136.

Assume that programmer 127 has selected the next symbol for display upon cathode ray tube 133. This decision is transmitted to character gating circuit 128 for effectively connecting that symbol line to the intensity amplifier 131. Printing of that symbol will not be initiated, however, until an input print pulse is applied to terminal 141; and to insure that scanning proceeds in the established pattern, synchronizer 142 has been provided to preclude further transmittal of a pulse applied to terminal 141 until a synchronizing signal is obtained at terminal 114 from row driver 21. As noted in reference to Fig. 6, a pulse is obtained at terminal 114 prior to the time when the timing pulse has fully progressed through the cascaded blocking oscillator stages. The synchronizing pulse is not taken from the last of the driver stages because some time delay will be experienced in synchronizing subsequent control circuits. In any event, an input print pulse applied to terminal 141 will be momentarily stored in synchronizer 142 and will be released when the synchronizing pulse is generated by row driver circuit 21.

Figure 3:
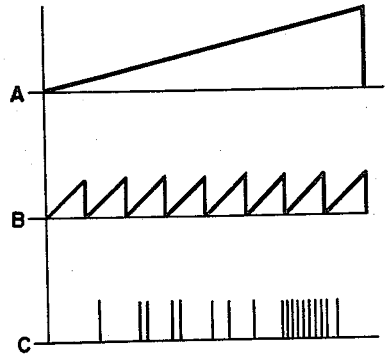
Fig. 3 is a graphical illustration of potential waveforms utilized in the present invention.

In Fig. 7, it may be seen that the output of synchronizer 142 is applied to a print control circuit 145, which is essentially an electronic switching device, from which point it is applied to the column driver at terminal 101 (see Fig. 6) for the purpose of setting the fifty-seventh core —P–8—. As previously discussed, this will initiate the sequential scanning of the cores beginning at the lower left-hand corner of the matrix and terminating at the fifty-sixth core —G–8— at the upper right-hand corner thereof. During this period, only those electrical impulses generated in the symbol line gated through to intensity amplifier 131 will be of utility. Thus, during the scanning cycle, waveforms such as shown in Fig. 3 will simultaneously be applied to the appropriate electrodes of cathode ray tube 113 for presentation of the selected symbol. At such time that the fifty-sixth core —G–8— in the upper right-hand corner is re-set to 0, the signal derived in coil 103 thereon (see Fig. 6) will be applied to the print control circuit 145, to indicate that the symbol scanning cycle is complete. Upon receipt of this fifty-sixth core pulse, the print control circuit, over lead 147, functions to actuate programmer 127 for the selection of the next symbol to be printed. Circuit 127 may then correspondingly actuate gating circuit 128 to connect the next programmed symbol line to intensity amplifier 131. However, irrespective of the symbol selected, no matrix scanning cycle will begin until the next print pulse is applied to terminal 141, unless the automatic recycling feature noted in relation to Fig. 6 is used. The receipt of the fifty-sixth core pulse also triggers, through print control 145, position circuits 150 which function to apply static potentials to the deflection plates of cathode ray tube 133 for locating the next symbol to be printed. Blanking circuit 152 actuated from the column driver 103 in a suitable manner is provided to introduce a blanking signal into intensity amplifier 131 to avoid confusing retract lines in the development of symbol patterns such as shown in Fig. 2.

Selection of the sequence of symbols to be printed under the influence of input print pulses at terminal 141 may, for example, be by internal prearrangement of programmer 127, or by external plug-board control, or by application at terminal 153 of a symbol selection potential waveform, in synchronism with the application of print impulses to terminal 141. The printing format on the face of the cathode ray tube may be set by synchronously applying positioning potentials to terminal 154. The nature of these potentials, and consequently, the precise nature of the electronic switching arrangements will vary with the needs of each specialized application. Notwithstanding the need to change symbols and positioning potentials, the scanning and video generating cycle under control of a print impulse is unchanged.

Depending upon the actual application of the magnetic core symbol generator disclosed above, the visual presentation upon a cathode ray tube face may be used as an end in itself to define areas or other marking thereon, or as the means to obtaining a more permanent printed record. Photographic or xerographic techniques may be used for the ultimate record. With respect to the photographic technique, it should be noted that camera and film processing have been made available for large screen radar and television systems which occasion a delay of but a few seconds from exposure, to print, to projection. Synchronization of the film frame advance and the symbol generator hereinabove described is a simple matter which needs no further description, and if required, no undue problem would be posed to build a recording unit using time-shared systems so that while a first camera is recording an exposure, a second advances its film to the next frame.

The unusual versatility and flexibility of the novel symbol generator herein disclosed is apparent from consideration of the fact that using a matrix as shown in Fig. 6, and a display of one-eighth inch characters, over six thousand characters may be arranged in unambiguous spaced relationship upon the face of a fifteen inch cathode ray tube. As noted earlier, the speed at which this system may operate is primarily constrained by the speed at which a magnetic core element may be switched from one to another of its stable states. Using cores formed of Deltamax tape and a single strand of relatively fine enamel-insulated wire for each symbol line, it has been possible to develop eight thousand symbols per second from a matrix offering fifty-six dot positions, with appropriate character spacing. Still higher speeds are possible without unusual design alteration.

Because of these exceptional printing speeds, this magnetic core symbol generator is found capable of accepting data at speeds equal to or greater than the internal access time of most available high speed digital computers. As a result, the symbol generator may be used directly as the final output for electronic computation apparatus. The ultimate utility of the symbol signal generator herein disclosed is substantially unlimited by virtue of its remarkable flexibility and eace of control. In communications systems, this arrangement may be used for the direct display of information over existing communication links. Wide application in this field is possible particularly because of the reliability stemming from the use of passive magnetic elements as the signal generating mechanism and because of the low cost achieved through the use of relatively few tubes. Those tubes which are employed are in fact uncritical as to adjustment because they are primarily current sources where only the maximum value is at all important.

It has been found to advantage to construct the magnetic core matrix substantially in the rectangular pattern disclosed in Figs. 4, 6 and 7 to facilitate the later addition and change of symbols threaded through the core. To a certain extent, the rectangular physical layout of cores is wasteful of space, but such loss is defensible in view of the ease of character wiring. However, if a preselected number of symbols were to be permanently wired into the unit in applications where symbol change is neither needed nor desired, the matrix cores could be stacked in any compact manner so long as the wiring was functionally the same as indicated in the drawing.

Numerous modifications of the basic invention herein disclosed will, of course, be obvious and suggest themselves as a symbol generator is designed for specific use. Obviously, the matrix size may be varied over broad ranges, and should larger signal outputs be desired, the symbol lines may be looped several times about each core. Further, additional cores, each performing substantially the function of the vestigial eighth column earlier discussed may be introduced for additional character spacing.

Other forms of matrix drive circuits may be used, and although synchronizing signals were taken from specific points in the circuit, it is obvious that pulsed signals bearing corresponding information are simultaneously available at other points in the circuit.

In the view of these comments, it is apparent that various departures may be made by those skilled in this electrical art without fundamental, conceptual change. Accordingly, the invention herein is to be construed as limited only by the spirit and scope of the appended claims.

What is claimed is:

1. Apparatus for generating an electrical signal characteristic of a predetermined symbol comprising, a matrix formed of a substantially rectangular array of magnetic components, means for sequentially and abruptly altering the flux state of each of said components, and a conductor magnetically linked with components in said matrix disposed in a pattern corresponding to said symbol.

2. Apparatus for generating an electrical signal characteristic of a predetermined symbol comprising, a substantially rectangular matrix of bistable magnetic components, means for sequentially pulsing each of said components through a magnetic cycle, and conductive means magnetically linked with a pattern of said magnetic components in said matrix corresponding to said symbol.

3. Apparatus for generating an electrical signal characteristic of a predetermined symbol comprising, a substantially rectangular matrix formed of rows and columns of toroidal magnetic cores, means for sequentially effecting a flux change in each of said cores, and a conductor extending through cores relatively positioned in said matrix in a pattern corresponding to said symbol; whereby flux change in each core enclosing said conductor induces a potential therein.

4. Apparatus for generating a pulsed electrical signal characteristic of a predetermined symbol comprising, a substantially rectangular matrix formed of rows and columns of toroidal magnetic cores, scanning means for sequentially pulsing a magnetic flux in the toroidal cores in one of said matrix columns, means responsive to the pulsing of a preselected toroidal core in each of said columns for initiating the sequential pulsing of the cores in the next succeeding column, and a conductor inductively coupled with toroidal cores distributed in said matrix in a pattern corresponding to said symbol.

5. Apparatus for generating a pulsed electrical signal characteristic of a predetermined symbol comprising, a substantially rectangular matrix formed of rows and columns of toroidal magnetic cores, means for sequentially effecting a flux change in each of said cores, a conductor inductively coupled with toroidal magnetic cores distributed in said matrix in a pattern corresponding to said symbol, said cores associated with said symbol lying in a number of columns less than the total of columns in said matrix for providing appropriate symbol spacing.

6. Apparatus for generating a pulsed electrical signal characteristic of a predetermined symbol comprising, a substantially rectangular matrix formed of rows and columns of toroidal magnetic cores, scanning means for sequentially pulsing a magnetic flux in each of the toroidal cores in the first of said matrix columns progressively from the first to the last of said matrix rows, means responsive to the pulsing of the toroidal core in the last row of each of said columns for initiating the sequential pulsing of the toroidal cores in the next succeeding column, and a conductor extending through and inductively coupled with toroidal cores distributed in said matrix in a pattern corresponding to said symbol.

7. Apparatus for generating a pulsed electrical signal characteristic of a predetermined symbol comprising, a substantially rectangular matrix formed of rows and columns of toroidal magnetic cores, scanning means for sequentially pulsing a magnetic flux in each of the toroidal cores in the first of said matrix columns progressively from the first to the last of said matrix rows, means responsive to the pulsing of the toroidal core in the last row of each of said columns for initiating the sequential pulsing of the torridal cores in the next succeeding column, means actuated by the pulsing of the toroidal core in the last row and column for indicating termination of a matrix scanning cycle, and a conductor extending through and inductively coupled with toroidal cores distributed in said matrix in a pattern corresponding to said symbol.

8. Apparatus for generating an electrical signal characteristic of a predetermined symbol comprising, a matrix of toroidal magnetic cores having first and second stable residual flux states of opposite polarity and arranged in a substantially rectangular pattern of rows and columns, a first driver circuit for sequentially setting said rows of said toroidal cores in said matrix to said first stable residual flux state, a second driver circuit actuated from said matrix for synchronously and sequentially setting adjacent columns of toroidal cores in said matrix to said second stable residual flux state, and means inductively associated with selected magnetic cores disposed in a geometric pattern in said matrix corresponding to the configuration of said symbol for providing said electrical signal.

9. Apparatus for generating an electrical signal characteristic of a predetermined symbol comprising, a matrix of toroidal magnetic cores having first and second stable residual flux states of opposite polarity and arranged in a substantially rectangular pattern of rows and columns, a first driver circuit for sequentially setting said rows of said toroidal cores in said matrix to said first stable state, a second driver circuit synchronously actuated from said matrix for sequentially setting said columns of toroidal cores in said matrix to said second stable state, means normally rendering said second driver circuit inoperative, means for initiating the operation of said second driver circuit subsequent to the setting of a predetermined row of said toroidal cores to said first stable state, and conductive means inductively linked with selected cores disposed in a geometric pattern in said matrix corresponding to the configuration of said symbol for providing said electrical signal.

10. A symbol generator comprising, a matrix of magnetic components each having first and second stable residual flux states of opposite polarity and arranged in a substantially rectangular pattern of rows and columns, means cyclically operative for sequentially setting said magnetic components in said matrix rows to said first stable residual flux state, synchronously related means for sequentially setting magnetic components in said matrix columns to said second stable residual flux state, and an output circuit common to magnetic components relatively disposed in said matrix in a pattern corresponding to a preselected symbol for detecting flux change therein.

11. A symbol generator comprising, a matrix of magnetic components each having first and second stable residual flux states of opposite polarity and arranged in a substantially rectangular pattern of rows and columns, means cyclically operative for sequentially setting said magnetic components in said matrix rows to said first stable residual flux state, synchronously related means for sequentially setting magnetic components in said matrix columns to said second stable residual flux state, and a plurality of output circuits, each of said output circuits being common to a distinctive pattern of magnetic components in said matrix of detecting flux change therein.

12. A symbol generator comprising, a matrix of magnetic components each having first and second stable residual flux states of opposite polarity and arranged in a substantially rectangular pattern of rows and columns, means cyclically operative for sequentially setting said magnetic components in said matrix rows to said first stable residual flux state, synchronously related means for sequentially setting magnetic components in said matrix columns to said second stable residual flux state, and a plurality of mutually insulated conductors, each of said conductors being common to an individually distinctive pattern of magnetic components in said matrix and inductively coupled therewith for yielding a potential pulse during residual flux state change therein.

13. A symbol generator comprising, a matrix of magnetic components each having first and second stable residual flux states of opposite polarity and arranged in a substantially rectangular pattern of rows and columns, a plurality of symbol conductors inductively linked with said magnetic components, first and second windings disposed on each of said magnetic components for oppositely controlling the flux state therein, means in each row for linking said first winding on each of said magnetic components therein, means in each column linking said second winding on each of said magnetic components therein, means for sequentially energizing said linked row windings, and synchronously related means for energizing said linked column windings.

14. A symbol generator comprising, a matrix of toroidal magnetic cores each having first and second residual flux states of opposite polarity and effectively arranged in a substantially rectangular pattern of rows and columns, each of said cores having first and second flux control windings disposed thereon, a plurality of conductors each extending through an individually distinctive configuration of said cores and inductively coupled therewith for yielding a potential pulse during residual flux state change therein, means associated with each of said rows for intercoupling first windings of cores therein, means associated with each of said columns for intercoupling second windings of cores therein, a plurality of driver stages equal in number to the sum of rows and columns of said matrix and arranged whereby one driver stage is respectively associated with the coupled windings in each of said rows and columns, signal delay means coupling each of said row driver stages with the exception of the last thereof to the next consecutive stage thereof, a source of periodic signals, means coupling said signal source to the driver stage associated with the first of said matrix rows, said first row driver stage being arranged whereby when actuated by a signal from said source, said first windings in said first row are pulsed setting all cores therein to said first stable residual flux state while simultaneously transmitting a signal for sequentially and correspondingly actuating and pulsing the remainder of said row driver stages and the respective cores in said matrix rows, the period of signals emanating from said source being greater than the time interval required for sequential actuation of all row driver stages through said signal delay means, and means for synchronously initiating the sequential actuation of said driver stages associated with said matrix core columns, each of said column driver stages being operative when actuated for pulsing said second windings in the respective column for setting all cores therein to said second stable residual flux state.

15. A symbol generator comprising, a matrix of toroidal magnetic cores each having first and second residual flux states of opposite polarity and arranged in a substantially rectangular pattern of rows and columns, each of said cores having first and second flux control windings disposed thereon, a plurality of conductors each extending through an individually distinctive configuration of said cores and inductively coupled therewith for yielding a potential pulse during residual flux state change therein, means associated with each of said rows for intercoupling first windings of cores therein, means associated with each of said columns for intercoupling second windings of cores therein, a plurality of driver stages equal in number to the sum of rows and columns of said matrix and arranged whereby one driver stage is respectively associated with the coupled windings in each of said rows and columns, signal delay means coupling each of said row driver stages with the exception of the last thereof to the next consecutive stage thereof, a first source of periodic signals, means coupling said first signal source to the driver stage associated with the first of said matrix rows, said first row driver stage being arranged whereby when actuated by a signal from said source, said first windings in said first row are pulsed setting all cores therein to said first stable residual flux state while simultaneously transmitting a signal for sequentially and correspondingly actuating and pulsing the remainder of said row driver stages and the respective cores in said matrix rows, the period of signals emanating from said first source being greater than the time interval required for sequential actuation of all row driver stages through said signal delay means, means associated with cores in the last of said matrix rows for synchronously initiating the sequential actuation of said driver stages associated with said matrix columns, each of said column driver stages being operative when actuated for pulsing said second windings in the respective column for setting all cores therein to said second stable residual flux state, said last-mentioned means being normally inoperative, and a second signal source synchronously related to said first signal source for rendering said last-mentioned means operative.

16. A symbol generator comprising, a matrix of toroidal magnetic cores each having first and second residual flux states of opposite polarity and arranged in a substantially rectangular pattern of rows and columns, each of said cores having first and second flux control windings disposed thereon, a plurality of conductors each extending through an individually distinctive configuration of said cores and inductively coupled therewith for yielding a potential pulse during residual flux state change therein, means associated with each of said rows for intercoupling first windings of cores therein, means associated with each of said columns for intercoupling second windings of cores therein, a plurality of driver stages equal in number to the sum of rows and columns of said matrix and arranged whereby one driver stage is respectively associated with the coupled windings in each of said rows and columns, signal delay means coupling each of said row driver stages with the exception of the last thereof to the next consecutive stage thereof, a first source of periodic signals, means coupling said first signal source to the driver stage associated with the first of said matrix rows, said first row driver stage being arranged whereby when actuated by a signal from said source, said first windings in said first row are pulsed setting all cores therein to said first stable residual flux state while simultaneously transmitting a signal for sequentially and correspondingly actuating and pulsing the remainder of said row driver stages and the respective cores in said matrix rows, the period of signals derived from said source being greater than the time interval required for sequential actuation of all row driver stages through said signal delay means, a second signal source, a bistable toroidal magnetic core external to the matrix as aforesaid and energized from said last row driver stage and said second signal source for synchronously initiating the sequential actuation of said driver stages associated with said matrix columns, each of said column driver stages being operative when actuated for pulsing said second windings in the respective column and setting all cores therein to said second stable residual flux state.

17. Apparatus as in claim 16 and including means responsive when the core in the last row and last column of said matrix is set to said first stable state from said second stable state for rendering inoperative the sequential actuation of said column driver stages.

18. A symbol generator comprising, a matrix formed of a plurality of magnetic components having a normal flux condition therein, means for scanning said matrix by successively altering and restoring the normal flux condition in each of said components in predetermined order and sequence, a cathode ray tube, means for deflecting the beam of said cathode ray tube in a pattern corresponding to the order in which said matrix components are scanned as aforesaid, a plurality of conductors, each of said conductors being inductively associated with an individually distinctive configuration of magnetic components in overlapping areas of said matrix and each being responsive to flux change in the associated magnetic components for deriving an intensity control signal for said cathode ray tube.

19. A symbol generator comprising, a substantially rectangular matrix of magnetic components having a normal flux condition therein, means for scanning said matrix by successively altering and restoring the normal flux condition in each of said components in predetermined sequence, a cathode ray tube, means for deflecting the beam of said cathode ray tube in a rectangular pattern substantially in synchronism with the scanning of said matrix, a plurality of conductors, each of said conductors being inductively associated with an individually distinctive configuration of magnetic components in said matrix and each being responsive to flux change in the associated magnetic components for deriving an intensity control signal for said cathode ray tube, means selectively coupling one of said plurality of conductors to said cathode ray tube during the scanning of said matrix for display of a symbol thereon as a pattern of points corresponding to the distribution of said associated components in said matrix.

20. A symbol generator comprising, a cathode ray tube, means for generating sweep signals for scanning a substantially rectangular raster upon said cathode ray tube, a magnetic core matrix, means for simultaneously deriving a plurality of pulsed potentials representative of a corresponding plurality of individually distinctive symbols, and means for selectively applying one of said pulsed potentials to said cathode ray tube in synchronism with the application of said sweep signals.

21. A symbol generator comprising, a substantially rectangular matrix of magnetic components having a normal flux condition therein, means for scanning said matrix by successively altering and restoring the normal flux condition in each of said components in predetermined sequence, a cathode ray tube, means for generating sweep signals for deflecting the beam of said cathode ray tube in a rectangular pattern substantially in synchronism with the scanning of said matrix, a plurality of mutually insulated symbol conductors each associated with an individually distinctive configuration of magnetic components in said matrix and each responsive to flux change in the associated components for deriving an intensity control signal for said cathode ray tube, a gating circuit, means actuating said gating circuit for selectively coupling one of said symbol conductors to said cathode ray tube for intensity control thereof.

22. A symbol generator comprising, a substantially rectangular matrix of magnetic components having a normal flux condition therein, means for scanning said matrix by successively altering and restoring the normal flux condition in each of said components in predetermined sequence, a cathode ray tube, means for generating sweep signals for deflecting the beam of said cathode ray tube in a rectangular pattern substantially in synchronism with the scanning of said matrix, a plurality of mutually insulated symbol conductors each associated with an individually distinctive configuration of magnetic components in said matrix and each responsive to flux change in the associated components for deriving an intensity control signal for said cathode ray tube, a timing signal oscillator establishing the scanning rate of magnetic components in said matrix, means for applying a control impulse to said symbol generator, and means operative under control of said matrix scanning means and responsive to the application of said control impulse for synchronously and selectively coupling one of said plurality of symbol conductors to said cathode ray tube during a complete scan of said matrix for display of the respective symbol as a pattern of luminous points corresponding to the distribution of said magnetic components associated with said symbol conductor in said matrix.

23. A symbol generator comprising, a substantially rectangular matrix of magnetic components each having a normal flux condition therein, means for scanning said matrix by successively altering and restoring the normal flux condition in each of said components in predetermined sequence, a cathode ray tube, means for generating sweep signals for deflecting the beam of said cathode ray tube in a rectangular pattern substantially in synchronism with the scanning of said matrix, a plurality of mutually insulated symbol conductors each associated with an individually distinctive configuration of magnetic components in said matrix and each responsive to flux change in the associated components for deriving an intensity control signal for said cathode ray tube, a timing signal oscillator establishing the scanning rate of magnetic components in said matrix, means for applying a control impulse to said symbol generator, means operative under control of said matrix scanning means and responsive to the application of said control impulse for synchronously and selectively coupling one of said plurality of symbol conductors to said cathode ray tube during a complete scan of said matrix for display of the respective symbol as a pattern of luminous points corresponding to the distribution of said magnetic components associated with said symbol conductor in said matrix, means associated with said matrix for providing a pulse at the termination of a complete scan thereof, and means responsive to said last-mentioned pulse for selectively coupling another of said plurality of symbol conductors for coupling to said cathode ray tube.

24. A symbol generator comprising, a substantially rectangular matrix of magnetic components having a normal flux condition therein, means for scanning said matrix by successively altering and restoring the normal flux condition in each of said components in predetermined sequence, a cathode ray tube, means for generating sweep signals for deflecting the beam of said cathode ray tube in a rectangular pattern substantially in synchronism with the scanning of said matrix, a plurality of mutually insulated symbol conductors each associated with an individually distinctive configuration of magnetic components in said matrix and each responsive to flux change in the associated components for deriving an intensity control signal for said cathode ray tube, a gating circuit, means for applying a control impulse to said symbol generator for initiating the aforesaid scanning of said matrix, means associated with said matrix for deriving a pulse at the termination of a complete scan thereof, and means responsive to said last-mentioned pulse for actuating said gating circuit for selectively coupling one of said symbol conductors to said cathode ray tube for intensity control thereof.

25. Apparatus as in claim 24 and including means responsive to said last-mentioned pulse for establishing the position of said cathode ray tube beam.

26. A symbol generator as in claim 14 and including a cathode ray tube having beam deflection and intensity control means therein, a gating circuit for selectively coupling one of said plurality of conductors to said cathode ray tube for intensity control thereof, and means associated with said row and column driver stages for synchronously actuating said gating circuit and said beam deflection means.

27. Apparatus as in claim 14 and including a cathode ray tube having beam deflection and intensity control means therein, a gating circuit for selectively coupling one of said plurality of conductors to said cathode ray tube for intensity control thereof, horizontal and vertical sweep generating circuits for actuating said beam deflecting means, means associated with said row driver stages for synchronizing said horizontal sweep generating circuit, means associated with said column driver stages for synchronizing said vertical sweep generating circuit, and means responsive to the setting of the core in the last row and column from the second stable residual flux state to the first flux state for actuating said symbol gating circuit.

28. In a symbol generator, a magnetic matrix formed of a plurality of magnetic memory units each characterized by a substantially rectangular hysteresis loop and each having two substantially stable residual flux states, means for reversing and restoring the residual flux state of each of said magnetic units in a predetermined pattern, and an output conductor geometrically related to said pattern of reversal in a configuration corresponding to an arbitrary symbol and intercoupling selected units in said matrix for providing an output signal.

29. A symbol generator comprising, a substantially rectangular matrix of bistable toroidal magnetic components having an initial flux condition therein, means for scanning said matrix by successively reversing and restoring the initial flux condition in each of said toroidal components in predetermined sequence, a cathode ray tube, means for deflecting the beam of said cathode ray tube in a rectangular pattern substantially in synchronism with the scanning of said matrix, a plurality of conductors, each passing through, and thereby inductively associated with, an individually distinctive configuration of said magnetic components in said matrix, each of said conductors being responsive to flux reversal in the magnetic components through which it passes for deriving an intensity control signal for said cathode tube, and means for selectively coupling one of said plurality of conductors to said cathode ray tube during each scan of said matrix for display of a symbol thereon as a pattern of points corresponding to the distribution of said associated components in said matrix.

30. A symbol generator comprising, a substantially rectangular matrix of toroidal bistable magnetic components having an initial flux condition therein, means for scanning said matrix by successively reversing and restoring the initial flux condition in each of said toroidal components in predetermined sequence, a cathode ray tube, means for deflecting the beam of said cathode ray tube in a rectangular pattern substantially in synchronism with the scanning of said matrix, a plurality of mutually insulated conductors each threaded through, and thereby inductively associated with, an individually distinctive configuration of magnetic components in said matrix, flux reversal in each of said toroidal cores being effective simultaneously to induce intensity control electrical impulses in those of said conductors threaded therethrough, and means for selectively coupling any one of said plurality of conductors to said cathode ray tube during a scan of said matrix for display of that symbol as a pattern of points corresponding to the distribution of associated toroidal magnetic components in said matrix.

31. A signal generator for simultaneously generating time spaced patterns of electrical impulses representative of a plurality of preset symbols of arbitrary geometric shape comprising, a substantially rectangular matrix of toroidal bistable magnetic components having a normal flux condition therein, means for scanning said matrix by successively reversing and restoring the normal flux condition of each of said toroidal components in predetermined sequence, and an individual insulated conductor for each of said plurality of symbols, each conductor being inductively linked with a configuration of toroidal magnetic components distributed in said matrix, in relation to the scanning sequence, in a pattern corresponding to the geometrical shape of the symbol to be generated, flux reversal in each of said toroidal cores being effective simultaneously to induce electrical impulses in those of said conductors inductively linked therewith.

32. Apparatus as in claim 31, including, means for visually displaying electrical impulses, and means for selectively coupling any one conductor to said display means during a scan of said matrix.

33. A symbol generator comprising, a rectangular matrix of toroidal bistable magnetic components, scanning means coupled to said matrix for successively reversing and restoring the flux condition of each of said toroidal components in predetermined sequence, and a plurality mutually insulated superposed conductors each inductively linked with an individually distinctive pattern of toroidal magnetic components in said matrix, flux reversal in each of the toroidal components being effective simultaneously to induce electrical impulses in those of said superposed conductors linked therewith, whereby each of said conductors provides a pulsed electrical signal representative of the pattern traced thereby through said matrix.

34. A symbol generator comprising, a matrix of toroidal magnetic components, scanning means coupled to said matrix for successively altering the flux condition of each of said components in predetermined sequence, a plurality of superposed mutually insulated conductors generally in the configuration of symbols of arbitrary geometric shape, each of said conductors being threaded through, and thereby inductively associated with, magnetic components distributed in said matrix in accordance with the symbol to be represented thereby, all of said symbol conductors linking a given core in said matrix being responsive to flux change therein simultaneously to provide pulsed electrical signals.

References Cited in the file of this patent

UNITED STATES PATENTS

| | | |
|---|---|---|
| 2,594,731 | Connolly | Apr. 29, 1952 |
| 2,614,167 | Kamm | Oct. 14, 1952 |
| 2,657,377 | Gray | Oct. 27, 1953 |
| 2,657,378 | Gray | Oct. 27, 1953 |
| 2,691,156 | Saltz | Oct. 5, 1954 |
| 2,708,267 | Weidenhammer | May 10, 1955 |
| 2,719,965 | Person | Oct. 4, 1955 |
| 2,730,694 | Williamson | Jan. 10, 1956 |
| 2,732,542 | Minnich | Jan. 24, 1956 |

OTHER REFERENCES

Wang: Proceedings of the Association of Computing Machinery, May 2 and 3, 1952, pp. 207–212.

Gordon and Nicola: Proceedings of the Association of Computing Machinery, September 1952, pages 6–12.

Rajchman: Static Magnetic Matrix Memory and Switching Circuits, RCA Review, June 1952.

Brown: Ferrites Speed, Electronics, April 1953, pp. 146–149.

An Wang: Electronics, May, 1953, pp. 200–204, High Speed Number Generator Uses Mag. Memory Matrices.